July 3, 1956        F. W. LINDBLOM        2,752,820
SPECTACLE FRAME
Filed Oct. 21, 1952
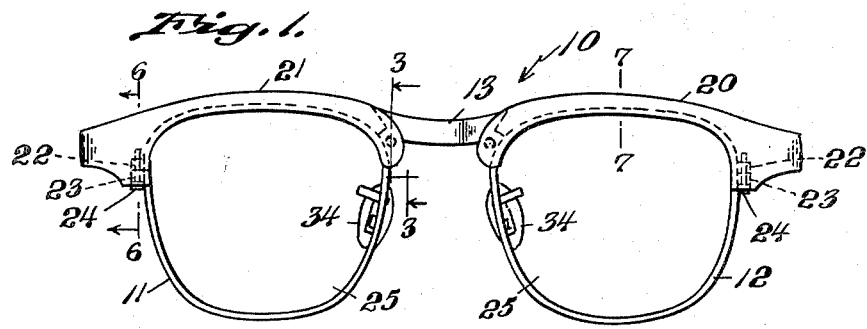
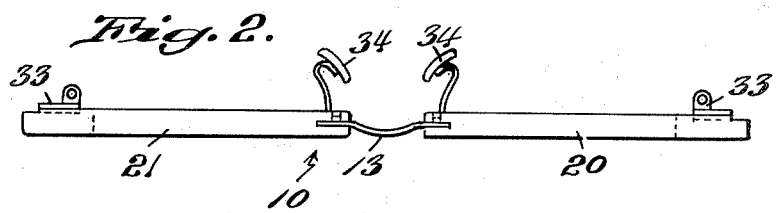
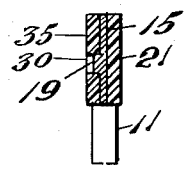
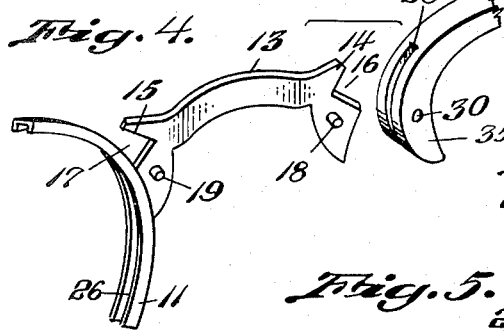
INVENTOR.
Frank W. Lindblom
BY Barlow & Barlow
ATTORNEYS.

United States Patent Office 2,752,820
Patented July 3, 1956

2,752,820

SPECTACLE FRAME

Frank W. Lindblom, Warwick, R. I., assignor to Welsh Manufacturing Company, a corporation of Rhode Island Application October 21, 1952, Serial No. 316,003

2 Claims. (Cl. 88—41)

This invention relates to a spectacle frame of the type which embodies the combination of a metallic front and non-metallic parts.

Non-metallic rim parts over metallic rims have heretofore been used in many styles of spectacles and have been fastened together primarily with rivets.

It is therefore one of the objects of this invention to provide a non-metallic rim part and metallic rim assembly wherein the parts need not be riveted together.

A further object of this invention is to provide an improved spectacle frame of the type described, which will be durable and yet be easily assembled with a screw driver.

Another object is to provide a spectacle frame having improved means for securing the non-metallic parts to the metallic parts.

Another object is to provide in such a frame an improved connection between the non-metallic rim part and the bridge member.

With these and other objects in view, the invention consists of certain novel features of construction as will be more fully described an particularly pointed out in the appended claims.

In the accompanying drawings:

Figure 1 is a front view of the spectacle frame;

Figure 2 is a top plan view of Figure 1;

Figure 3 is a sectional view taken on lines 3—3 of Figure 1 showing the manner in which the non-metallic rim parts are fastened to the metallic bridge structure;

Figure 4 is a fragmentary view of the bridge connection structure showing certain of the metallic and non-metallic parts in separated relationship;

Figure 5 is a sectional view of one of the non-metallic rim parts;

Figure 6 is a sectional view of the temporal end of the non-metallic rim part taken on lines 6—6 of Figure 1; and Figure 7 is a sectional view taken on lines 7—7 of Figure 1.

In proceeding with this invention, I provide two rim parts, each extending along the upper portion of each lens rim, and I secure each rim part in position by providing a longitudinal projection on each end of the bridge member and also a pin extending rearwardly therefrom, these parts interengaging slots and depressions, respectively, in the non-metallic rim part. I further secure the non-metallic rim parts in position by providing a recess therein at the temporal end to receive rim connector lugs and their associated screw which threadingly engages the non-metallic rim part. I further provide a groove in the under portion of the non-metallic rim part to receive the metallic rim. Thus the non-metallic rim part is held in position solely by means of the structure at the bridge end in combination with the screw at the temporal end, it being found that this aids in the assembly of the parts by sliding the rim part along the upper portion of the metallic rims into engagement with the projections on the bridge portion and then pressing the connector lugs into the recess at the temporal end of the non-metallic rim part, threading the connector screw into the non-metallic rim part.

With reference to the drawings, 10 indicates generally a spectacle frame having two metallic lens rims 11 and 12 connected by a bridge member 13, for example, as by soldering. Each lens rim is split at its temporal side and the upper connector lugs 22 and lower connector lugs 23 are secured to adjacent ends of the lens rims so that by means of the crews 24 the lenses 25 are detachably held in the grooves 26 of the lens rims 11 and 12.

The upper portion of the bridge 13 has portions 14 and 15 which project longitudinally of the bridge and partially overhang the metallic rims 11 and 12 by projecting therealong in spaced relationship thereto and provide therein the recesses 16 and 17. Extending rearwardly of the connection portion of the bridge member are two pins 18 and 19. Along the upper portion of the rims 11 and 12 are non-metallic rim parts 20 and 21 which are formed of a suitable non-metallic plastic material and which extend from the bridge to the connecting lugs on the temporal side of the spectacle frame. Each of the rim parts 20 and 21 has an internal groove 27 within which the lens rims 11 and 12 are seated. At the bridge end of the rim parts 20 and 21 there are slots 28 which are on the same plane with and intersect the groove 27 and are adapted to receive a portion of the bridge 13. The rim part at this bridge end extends downwardly providing ears on either side of the bridge. A further slot 29 is provided in each rim part 20 and 21 which is on a plane with and intersects the slot 28 to receive the projections 14 and 15 of the bridge 13, the part 29′ of the member nesting in one of the recesses 16 or 17. A hole or depression 30 is provided in the ear section 35 of the rim parts 20 and 21 to accept the pins 18 and 19 of the bridge structure and secure the rim parts to the bridge structure by springing the ear 35 over the pin. The temporal portions of the rim parts 20 and 21 have enlarged recesses 31 in which the lug connectors 22 and 23 are located. A bore 32 is provided leading from the enlarged recess 31 to accept the screw 24 and may be either threaded or of a size to accept a self-threading screw.

Secured to the rear faces of the temporal ends of the rim parts are temple hingle plates 33. The usual nose pads 34 are secured to the nasal sides of the lens rims 11 and 12, while temples (not shown) are hinged to the plates 33 in the usual manner.

From the foregoing it will be apparent that I have provided a spectacle frame employing metallic and non-metallic parts in which these parts may be readily assembled. With my structure the slot 28 and the groove 27 of the non-metallic rim parts may be engaged with the upper portion of the metallic rims 11 and 12 adjacent the bridge member 13 and the non-metallic rim part may then be slid along the metallic rim toward the bridge member 13, the ears 35 being spread over the pins 18, 19, whereupon the projections 14 and 15 will seat themselves in the slots 29 and the pins in the holes 30. The temporal end of the non-metallic rim part may then be pressed downwardly, the connector lugs 23 and 24 fitting into the enlarged recess 31. Lenses 25 are then inserted in the grooves 26 of the metallic rims and the securing screw 24 threaded both into the upper connector lug 23 and the bore 32 of the non-metallic rim part to complete the assembly of the spectacles.

Various modifications can obviously be made without departing from the spirit of my invention as pointed out in the appended claims.

I claim:

1. In a spectacle, a pair of metallic rims, each being split at the temporal side thereof with each rim having at its ends upper and lower connector lugs, a metal bridge connecting the nasal side of said rims and having at each end portion an integral pin projecting therefrom, a non-metallic rim part extending along the upper portion of each rim and having top and side walls forming an internal groove within which the rims are seated, said rim part having a slot extending inwardly at the nasal end thereof to receive the adjacent bridge portion, said side walls at the slotted end extending downwardly providing ears extending along either side of said bridge, said ears and side walls along the slotted portion being resiliently laterally expandable, one of said ears having a recess receiving said pin which may be positioned therein by spreading the ears, the temporal end of said rim part having a recess within which said lugs are positioned, a screw to fasten the upper and lower connector lugs, said screw being of a sufficient length to threadingly engage the rim part adjacent the lugs and hold the lens rim through the connector lugs in abutting relationship with the rim part.

2. In a spectacle, a pair of metallic rims, each being split at the temporal side thereof with each end portion having a connector lug, a metal bridge connecting the nasal side of said rims and having at each end portion an integral pin projecting therefrom and an undercut recess adjacent its upper end, a non-metallic rim part extending along the upper portion of each rim and having top and side walls forming an internal groove within which the rims are seated, said rim part having a slot extending inwardly at the nasal end thereof to receive the adjacent bridge portion and the end wall of said slot extending into said undercut recess, said side walls at the slotted end extending downwardly providing ears extending along either side of said bridge, said ears and side walls along the slotted portion being resiliently laterally expandable, one of said ears having a recess receiving said pin which may be positioned therein by spreading the ears, the temporal end of said rim part having a recess within which said lugs are positioned, and means for securing said lugs and temporal end of said rim part together.

References Cited in the file of this patent

UNITED STATES PATENTS

| | | |
|---|---|---|
| 1,664,093 | Stevens | Mar. 27, 1928 |
| 2,482,195 | Martin | Sept. 20, 1949 |
| 2,577,380 | Stegeman | Dec. 4, 1951 |